3,112,291
RUBBER PRODUCTS RESISTANT TO RADIATION DAMAGE
Herbert R. Anderson, Jr., Bartlesville, Okla., assignor to Phillips Petroleum Company, a corporation of Delaware
No Drawing. Filed Dec. 14, 1959, Ser. No. 859,149
4 Claims. (Cl. 260—45.8)

This invention relates to rubber products resistant to radiation damage.

The word "rubber" as used herein includes both natural and synthetic rubbery materials.

Rubber vulcanizates, when subjected to ionizing radiation, undergo deterioration in stress-strain properties, this being due to chain scission and cross linking. For instance, when some vulcanizates are subjected to radiation, such as alpha rays, beta rays, gamma rays, or neutrons, there is a considerable increase in the modulus of the product and the number of network chains, related to cross links, is increased. Other vulcanizates, when subjected to the same radiation, are degraded to softer and even liquid products. Such changes are undesirable in either case because the physical properties of the rubber are harmed by this radiation.

Some research has been done to determine what additives can be incorporated in the rubber to produce products which are resistant to radiation or at least more resistant than the material without the use of such additives. These additives are referred to as radiation damage inhibitors or anti-rads. I have discovered a group of compounds which are very effective in reducing this deterioration or radiation damage. Broadly speaking these compounds are heterocyclic compounds which contain two hetero atoms in the ring structure and are selected from the group consisting of oxazoles, thiazoles, isooxazoles and pyrazoles.

Thus, broadly speaking, my invention resides in (1) a method comprising incorporating in rubber certain oxazoles, thiazoles, isooxazoles and pyrazoles, all defined further hereinafter, to render said rubber resistant to radiation damage, and (2) a rubber product which is resistant to radiation damage.

An object of my invention is to provide rubber vulcanizates which are resistant to radiation damage. A further object of my invention is to provide compositions containing certain heterocyclic compounds (defined further hereinafter) which cause the product to exhibit less change in modulus than the same product which does not contain said heterocyclic compounds. A further object of my invention is to provide a method of inhibiting a rubber from damage caused by exposure to ionizing radiation. Other aspects, objects and advantages of the invention will be apparent to those skilled in the art upon reading the disclosure.

Thus, according to my invention, there is provided a method comprising incorporating in rubber during the compounding thereof a compound having the formula

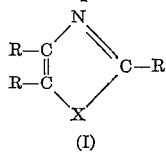

(I)

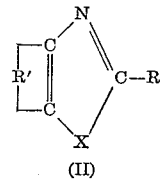

(II)

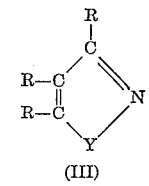

(III)

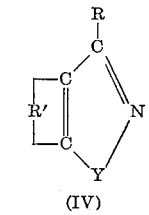

(IV)

wherein: X is selected from the group consisting of oxygen and sulfur; Y is selcted from the group consisting of oxygen and an >N—H radical; each R is selected from the group consisting of a hydrogen atom, hydroxy, amino, alkoxy, aryloxy, alkyl, aryl, cycloalkyl, alkaryl, aralkyl, and arylaryl radicals, and said radicals which are hydrocarbon radicals substituted with a substituent selected from the group consisting of hydroxy, amino, alkoxy, and aryloxy radicals; R' is selected from the group consisting of —C=C—C=C—,

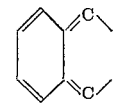

and

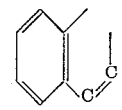

radicals; the number of carbon atoms in each of said R substituents does not exceed 20; and the total number of carbon atoms in said R substituents does not exceed 30.

Further according to the invention, there is provided a method of inhibiting a rubber from damage which is caused by exposure to ionizing radiation, which method comprises incorporating into said rubber, as a radiation damage inhibitor, at least one of the above defined heterocyclic compounds represented by Formulas I, II, III and IV.

In the above Formulas I and II when X is oxygen the compounds are oxazoles, and when X is sulfur the compounds are thiazoles. In Formulas III and IV when Y is oxygen the compounds are isooxazoles, and when Y is an >N—H radical, the compounds are pyrazoles. It is to be noted that all of the compounds of the invention contain at least one carbon to carbon double bond, at least one nitrogen to carbon double bond, and two hetero atoms in the ring structure. It is presently believed that these structural features are responsible for the radiation damage inhibiting properties of said compounds.

Examples of heterocyclic compounds which can be used in the practice of the invention include, among others:

oxazole;
2,5-diphenyloxazole;
2-(1-naphthyl)-5-phenyloxazole;
2-phenyl-5-(p-biphenylyl)oxazole;
2-methyloxazole;
2,4,5-trimethyloxazole;
2-n-butyl-5-decyloxazole;
2-tridecyloxazole;
2,4,5-tri(decyl)oxazole;
2-eicosyloxazole;
2-ethoxyoxazole;
2-pentadecoxy-4,5-dimethyloxazole;
2-phenoxyoxazole;
2-hydroxyoxazole;
2-amino-4-phenyloxazole;
2-cyclopentyloxazole;
2-p-tolyl-4,5-diethyloxazole;
2-benzyloxazole;
2-(1-naphthyl)-4-phenyloxazole;
2-(2-hydroxyethyl)-4,5-diphenyloxazole;
2-(3,aminopropyl)-4,5-diphenyloxazole;
2-eicosyl-4,5-dipentyloxazole;
2-(4-hydroxyphenyl)oxazole;
2,4-di(2,4-diaminophenyl)oxazole;
2,4,5-tri(4-butoxyphenyl)oxazole;
2-cyclohexyloxazole;
2-(4-phenoxyphenyl)oxazole;
benzoxazole;
2-hydroxybenzoxazole;
2-aminobenzoxazole;
2-cyclohexylbenzoxazole;
2-methylbenzoxazole;
2-dodecylbenzoxazole;
2-phenoxybenzoxazole;
2-biphenylylbenzoxazole;
2-aminonaphth[1,2]oxazole;
2-hydroxynaphth[2,3]-oxazole;
naph[1,2]oxazole;
thiazole;
2-aminothiazole;
2-hydroxythiazole;
2-methylthiazole;
2,5-diisopropylthiazole;
2-methoxy-4,5-di-n-butylthiazole;
2-(3,5-diaminohexyl)thiazole;
2-(6-ethoxyhexyl)-4,5-diethylthiazole;
2-(4,8-diphenyloctyl)-4,5-dipentylthiazole;
2-eicosylthiazole;
2-eicosyl-4,5-pentylthiazole;
2-eicosyl-4-methyl-5-nonylthiazole;
2,4,5-triphenylthiazole;
2,4,5-tri-p-tolylthiazole;
4,5-di(4-methoxyphenyl)thiazole;
2-[2-(6,7-dimethyl)-naphthyl]thiazole;
2-benzyl-4-(2,4-diaminophenyl)thiazole;
2-cyclopentylthiazole;
benzothiazole;
2-aminonaphtho[1,2]thiazole;
2-phenylbenzothiazole;
2-hydroxybenzothiazole;
2-aminobenzothiazole;
2-cyclopentylbenzothiazole;
2-eicosylbenzothiazole;
2-(3,5-diaminononyl)benzothiazole;
2-(1-naphthyl)benzothiazole;
2-[1-(3,4,7,8-tetramethyl)naphthyl]benzothiazole;
2-phenoxybenzothiazole;
2-hexadecoxybenzothiazole;
naphtho[1,2]thiazole;
naphtho[2,3]thiazole;
isooxazole;
3-hydroxyisooxazole;
2-aminoisooxazole;
3-methylisooxazole;
3,4,5-trimethylisooxazole;
4,5-diisopropylisooxazole;
3-hexyl-4-butoxyisooxazole;
3-decoxy-4,5-diethylisooxazole;
3-dodecylisooxazole;
3-(3-aminopropyl)-4-phenylisooxazole;
3-(1-naphthyl)isooxazole;
3-phenoxyisooxazole;
3-[2-(6,7-dipentyl)naphthyl]4,5-dipentylisooxazole;
3-(4-tolyl)isooxazole;
3-(p-biphenylyl)-5-phenylisooxazole;
3-benzylisooxazole;
3,4,5-tri(cyclohexyl)isooxazole;
3,4,5-tri(4-hydroxyphenyl)isooxazole;
3-(2,4-diaminophenyl)isooxazole;
3-eicosylisooxazole;
benzisooxazole;
3-hydroxybenzisooxazole;
3-aminobenzisooxazole;
3-cyclopentylbenzisooxazole;
3-hexylbenzisooxazole;
3-octadecylbenzisooxazole;
naphth[1,2]isooxazole;
3-aminonaphth[2,3]isooxazole;
pyrazole;
3,5-dimethylpyrazole;
3-ethylpyrazole;
3-hydroxypyrazole;
3-aminopyrazole;
3-nonylpyrazole;
3-tetradecylpyrazole;
3-cyclohexylpyrazole;
3-phenylpyrazole;
3-(1-naphthyl)pyrazole;
3-(2-naphthyl)pyrazole;
3-benzylpyrazole;
3-(4-tolyl)pyrazole;
3,4,5-trimethylpyrazole;
3,4-dinonylpyrazole;
3-eicosyl-4,5-dipentylpyrazole;
3,5-dihexoxypyrazole;
3-phenoxy-4,5-diethylpyrazole;
3,4,5-tri(4-aminophenyl)pyrazole;
3,5-di(p-biphenylyl)pyrazole;
3-(2-phenoxyethyl)pyrazole;
3-(4,6-diaminoheptyl)-4,5-dipropylpyrazole;
3-methylcyclohexyl-4(p-biphenylyl)pyrazole;
benzopyrazole;
3-methylbenzopyrazole;
3-aminobenzopyrazole;
3-hydroxybenzopyrazole;
naphtho(1,2)pyrazole;
naphtho[2,3]pyrazole;
3-eicosylnaphtho[2,3]pyrazole;
3-phenoxybenzopyrazole;
3-benzylbenzopyrazole.

The amount of inhibitor employed in the practice of the invention will generally be within the range of from 2 to 10 parts by weight per 100 parts by weight of rubber. A preferred range is 4 to 7 parts by weight per 100 parts by weight of rubber. An amount in excess of 10 parts by weight per 100 parts by weight of rubber is seldom necessary; however, it is within the scope of the invention to increase the amount of inhibitor as desired.

The invention is applicable to all types of rubber, both natural and synthetic. The synthetic polymers include the groups prepared by polymerizing a conjugated diene of 4 to 10 carbon atoms, either alone, or in combination with an unsaturated comonomer such as styrene, acrylonitrile, methacrylonitrile, methyl vinyl ether, methyl methacrylate, vinyl-substituted pyridines and the like. Generally, the conjugated diene, such as butadiene, isoprene, hexadiene, etc., comprises a major amount of the monomer system. The invention is also applicable to polychloroprene and rubbers of the polyurethane and isocyanate types. For a more complete discussion of the various synthetic rubbers, attention is directed to Whitby, "Synthetic Rubber," published by John Wiley and Sons, Inc., New York, 1954.

The following examples set forth specific compositions made according to the present invention but obviously, considerable variation is possible from the specific amounts set forth in the examples. In said examples the resistance to radiation damage imparted by a given additive is measured by comparing the change in 100 percent modulus and the change in density of network chains which occurs in samples with and without the additive.

*Example I*

A 75/25 butadiene/styrene rubber was prepared by emulsion polymerization at 41° F. to give a polymer having a raw Mooney value (ML–4 at 212° F.) of 52 and a bound styrene content of 20 percent. A recipe for the production of such a polymer is:

| | Parts by weight |
|---|---|
| Butadiene | 75 |
| Styrene | 25 |
| Water | 180 |
| Rosin soap, K salt | 4.5 |
| Tamol N [1] | 0.15 |
| $Na_3PO_4 \cdot 12H_2O$ | 0.80 |
| p-Menthane hydroperoxide | 0.12 |
| $FeSO_4 \cdot 7H_2O$ | 0.20 |
| $K_4P_2O_7$ | 0.30 |
| Tert-dodecyl mercaptan as required for a 52 ML–4 rubber. | |

[1] Sodium salt of a naphthalene sulfonic acid condensed with formaldehyde.

This rubber was compounded using 5 parts by weight of 2,5-diphenyloxazole as an inhibitor. A control was was run in which no inhibitor was employed. The compounding recipe was as follows:

| | Parts by weight |
|---|---|
| Butadiene/styrene rubber | 100 |
| Carbon black [1] | 50 |
| Zinc oxide | 3 |
| Stearic acid | 1 |
| Flexamine [2] | 1 |
| Sulfur | 1.75 |
| Santocure [3] | 1 |
| 2,5-diphenyloxazole | 0 or 5 |

[1] Philblack O, high abrasion furnace black.
[2] A physical mixture containing 65 percent of a complex diarylamine-ketone reaction product and 35 percent of N,N'-diphenyl-p-phenylenediamine.
[3] N-cyclohexyl-2-benzothiazylsulfenamide.

The stocks were roll milled, sheeted off the mill, and cured 45 minutes at 307° F. Tensile specimens ⅛" wide and 2" long (length of test portion) were cut from the sheets which were 25–30 mils in thickness. Swell specimens ½" x 1" were also cut from the sheets. The specimens were packed into aluminum cans which were closed, purged with helium, and irradiated in a field of gamma rays from spent fuel elements from the Materials Testing Reactor at Arco, Idaho, at a canal temperature of approximately 75° F. A pressure of 25 pounds' helium was maintained in the cans during irradiation. Runs were made with total dosages of 0.5 and $1 \times 10^8$ roentgens. One set of samples was not irradiated but was reserved for control purposes. The irradiated materials were removed from the gamma ray field and physical properties were determined. Results were as follows:

| | Sample containing inhibitor | Control |
|---|---|---|
| 100% Modulus, p.s.i.: | | |
| Original | 330 | 390 |
| Increase after nominal radiation dose ($10^8$ roentgens): | | |
| 0.5 | 260 | 950 |
| 1 | 510 | 1,890 |
| Density of network chains $\times 10^4$ (moles/cc.): [1] | | |
| Original | 1.55 | 1.60 |
| Increase after nominal radiation dose ($10^7$ roentgens): | | |
| 0.5 | 1.04 | 2.55 |
| 1 | 1.80 | 4.20 |

[1] The density of network chains is related to the number of crosslinks by the function $$\nu = 2n - \frac{2\delta}{M}$$

where $n$ is the number of crosslinks, $\delta$ is the density of the polymer, and $M$ is the molecular weight.

*Example II*

The procedure of Example I was followed except that the inhibitor, or anti-rad, was 2-(1-naphthyl)-5-phenyloxazole. Five parts by weight of the inhibitor per 100 parts rubber was used. Physical properties of samples with and without the additive are shown in the following table:

| | Sample containing inhibitor | Control |
|---|---|---|
| 100% Modulus, p.s.i.: | | |
| Original | 340 | 390 |
| Increase after nominal radiation dose ($10^8$ roentgens): | | |
| 0.5 | 580 | 930 |
| 1 | 1,160 | 2,100 |
| Density of network chains $\times 10^4$ (moles/cc.): | | |
| Original | 1.65 | 1.60 |
| Increase after nominal radiation dose ($10^8$ roentgens): | | |
| 0.5 | 1.10 | 2.40 |
| 1 | 2.45 | 3.60 |

*Example III*

The procedure of Example I was followed except that 5 parts by weight of 2-phenyl-5-(p-biphenylyl)oxazole was used as the inhibitor. The change in 100 percent modulus upon irradiation was as follows:

| | Sample containing inhibitor | Control |
|---|---|---|
| 100% Modulus, p.s.i.: | | |
| Original | 380 | 400 |
| Increase after nominal radiation dose ($10^8$ roentgens): | | |
| 0.5 | 860 | 1,020 |
| 1 | 1,340 | 2,470 |

*Example IV*

The rubber of Example I was compounded using 5 parts by weight per 100 parts by weight of rubber of each of several inhibitors. The compounding recipe, curing, and irradiation were as described in the earlier example. Data showing the change in 100 percent modulus in each sample as well as for a control which did not contain any inhibitor are given in the following table:

| Inhibitor | 100% Modulus | | |
|---|---|---|---|
| | Original | Increase in p.s.i. after nominal radiation dose ($10^8$ roentgens) | |
| | | 0.5 | 1 |
| None | 420 | 1,160 | 1,970 |
| 2-Aminonaphtho(1,2)thiazole | 410 | 800 | 1,380 |
| 2-Aminithiazole | 460 | 1,140 | 1,380 |
| 2-Phenylbenzothiazole | 400 | 610 | 1,120 |
| Benzothiazole | 460 | 830 | 1,290 |
| 3,5-Dimethylpyrazole | 380 | 830 | 1,520 |

From the above examples it is believed apparent that each of the inhibitors brought about a marked reduction in change in 100 percent modulus and in the density of the network chains.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:
1. A rubber composition having incorporated therein, in an amount within the range of 2 to 10 parts by weight per 100 parts by weight of said rubber, at least one compound selected from the group of compounds characterized by the following structural formulas:

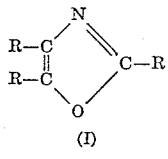

(I)

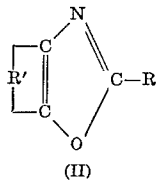

(II)

wherein: each R is selected from the group consisting of a hydrogen atom, hydroxy, amino, alkoxy, aryloxy, alkyl, aryl, cycloalkyl, alkaryl, aralkyl, and arylaryl radicals, and said radicals which are hydrocarbon radicals substituted with a substituent selected from the group consisting of hydroxy, amino, alkoxy, and aryloxy radicals; R' is selected from the group consisting of —C=C—C=C—,

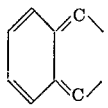

and

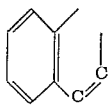

radicals; the number of carbon atoms in each of said R substituents does not exceed 20; and the total number of carbon atoms in said R substituents does not exceed 30.

2. A rubber composition comprising a rubber having 2,5-diphenyloxazole incorporated therein in an amount of from 2 to 10 parts by weight per 100 parts by weight of said rubber, said rubber being selected from the group consisting of natural rubber, synthetic rubber polymers prepared by polymerizing a conjugated diene containing from 4 to 10 carbon atoms, and synthetic rubber polymers prepared by polymerizing a conjugated diene containing from 4 to 10 carbon atoms with an unsaturated comonomer selected from the group consisting of styrene, acrylonitrile, methacrylonitrile, methyl vinyl ether, methyl methacrylate, and vinyl substituted pyridine.

3. A rubber composition comprising a rubber having 2-(1-naphthyl)-5-phenyloxazole incorporated therein in an amount of from 2 to 10 parts by weight per 100 parts by weight of said rubber, said rubber being selected from the group consisting of natural rubber, synthetic rubber polymers prepared by polymerizing a conjugated diene containing from 4 to 10 carbon atoms, and synthetic rubber polymers prepared by polymerizing a conjugated diene containing from 4 to 10 carbon atoms with an unsaturated comonomer selected from the group consisting of styrene, acrylonitrile, methacrylonitrile, methyl vinyl ether, methyl methacrylate, and vinyl substituted pyridine.

4. A rubber composition comprising a rubber having 2-phenyl-5-(p-biphenylyl)oxazole incorporated therein in an amount of from 2 to 10 parts by weight per 100 parts by weight of said rubber, said rubber being selected from the group consisting of natural rubber, synthetic rubber polymers prepared by polymerizing a conjugated diene containing from 4 to 10 carbon atoms, and synthetic rubber polymers prepared by polymerizing a conjugated diene containing from 4 to 10 carbon atoms with an unsaturated comonomer selected from the group consisting of styrene, acrylonitrile, methacrylonitrile, methyl vinyl ether, methyl methacrylate, and vinyl substituted pyridine.

References Cited in the file of this patent

UNITED STATES PATENTS

| 2,205,101 | Lichty | June 18, 1940 |
| 2,261,042 | Williams | Oct. 28, 1941 |
| 2,271,782 | Sloan | Feb. 3, 1942 |
| 2,323,504 | Wilson | July 6, 1943 |
| 2,508,324 | Anish | May 16, 1950 |
| 2,666,764 | Lanzilotti et al. | Jan. 19, 1954 |
| 2,863,874 | Gregory | Dec. 9, 1958 |
| 2,946,765 | Roos et al. | July 26, 1960 |

OTHER REFERENCES

The Chemistry of Organic Compounds, Conant, revised edition, Macmillan, New York, 1939, pp. 264, 520, last paragraph.

Harwood et al.: The Effects of Radiation on Materials, Reinhold, N.Y., 1958.